Sept. 18, 1945.  J. BOLSEY  2,384,790
TRIPOD HEAD
Filed Jan. 17, 1944  5 Sheets-Sheet 1

INVENTOR.
JACQUES BOLSEY
BY
his agent

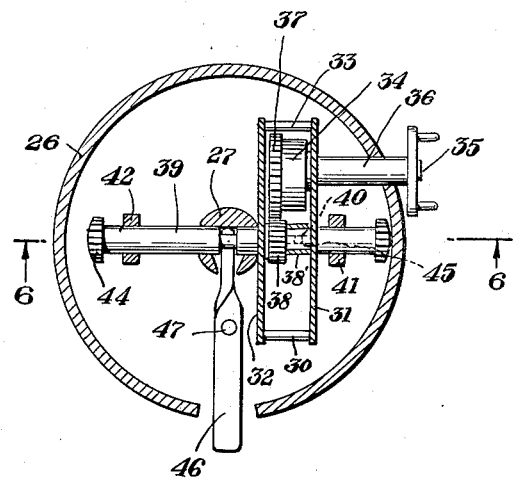
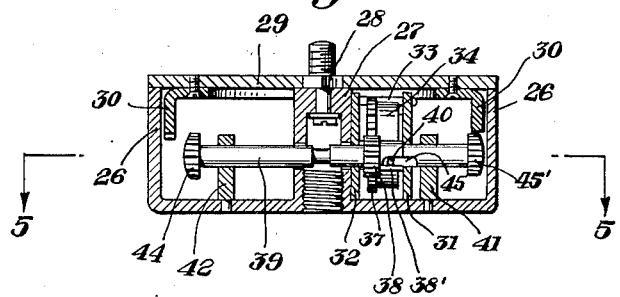

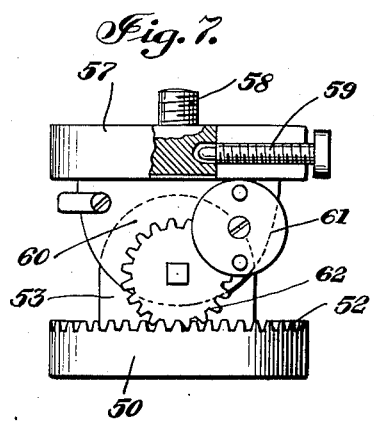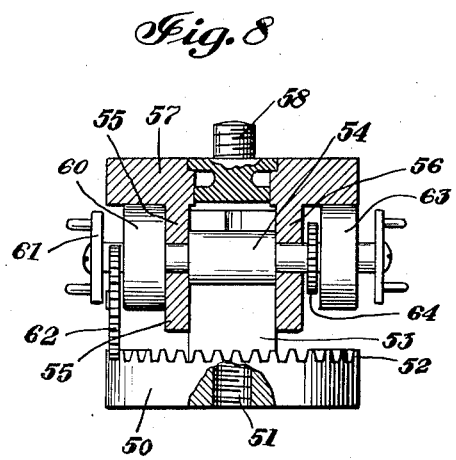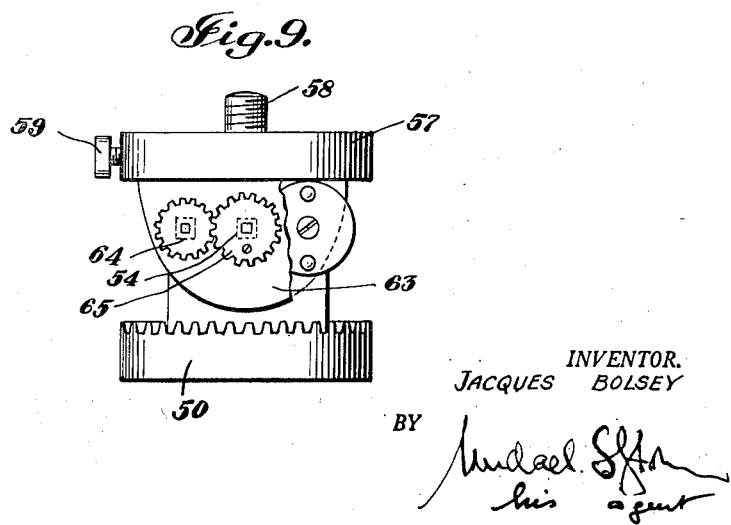

Sept. 18, 1945.　　　　J. BOLSEY　　　　2,384,790
TRIPOD HEAD
Filed Jan. 17, 1944　　　5 Sheets-Sheet 4

INVENTOR.
JACQUES BOLSEY
BY

Patented Sept. 18, 1945

2,384,790

UNITED STATES PATENT OFFICE 2,384,790

TRIPOD HEAD

Jacques Bolsey, New York, N. Y.

Application January 17, 1944, Serial No. 518,521

5 Claims. (Cl. 248—183)

This invention relates to tripod heads and, more particularly, to camera rotating units adapted to be inserted between the top of a tripod of the usual type and a camera.

It is an object of my invention to provide a motor-driven tripod head, i.e., to avoid, as far as possible, rotating and turning of the camera on the tripod head by hand.

It is a further object of my invention to arrange these driving means in such a manner as to enable rotating of the camera about a horizontal and/or a vertical axis.

Still a further object of my invention is to use, as far as possible, ready-built spring motor units for the purposes of my invention, i. e., for rotating and/or tilting of the camera.

Another object of my invention consists in providing means by which the speed of rotation about a vertical axis and/or the speed of turning about a horizontal axis may be regulated by hand, at will of the operator of the camera.

Still another object of my invention consists in providing means, associated with the rotating and turning arrangement proposed by me, for reversing the direction of rotation and/or turning.

With the above objects in view, my present invention mainly consists in a tripod head comprising a stationary base, a camera support turnably mounted on said stationary base, and a spring motor secured either to said stationary base or to said camera support for rotating the support about a vertical axis or for turning the same about a horizontal axis.

A preferred embodiment of my invention includes an intermediate member mounted rotatably, preferably about a vertical axis, on said base; in this case the camera support is mounted on said intermediate member, preferably turnable about a horizontal axis; one or two spring motors should be provided for rotating the intermediate member on the base and for turning the support on the intermediate member.

In order to make it possible to use my new camera rotating arrangement for tripods of the usual type, I propose to build separate camera rotating units adapted to be inserted between the top of a tripod of the usual type and the camera; this unit should include means for rotating the camera about a vertical axis and/or for turning it about a horizontal axis, i. e., one or more spring motors built into and forming part of this rotating unit.

This camera rotating unit, forming the main and most important embodiment of my present invention, comprises a base adapted to be screwed to the top of the tripod and a camera support adapted to support a camera screwed thereto. For this purpose, the base may be provided on its bottom face with a screw hole of the type used in cameras for screwing the same to the screw bolt usually provided on the top of a tripod, and the camera support may be provided on its top face with a screw bolt of the type used on the top of tripods for screwing a camera thereto. The base and the support are connected with each other either directly, as described above, or an intermediate member of the type described is inserted between them; furthermore, one or more spring motors are built into this unit for rotating and for turning the camera support.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a cross-section of a similar camera rotating unit, along line 5—5 of Fig. 6;

Fig. 6 is a cross-section of the unit shown in Fig. 5, along line 6—6 of Fig. 5;

Fig. 7 is a side view of a unit for rotating the camera support about a vertical axis and for turning it about a horizontal axis, equipped with two spring motors;

Fig. 8 is a cross section of the rotating unit shown in Figure 7;

Fig. 9 is a side view of the rotating unit shown in Fig. 8, partly in section;

Figure 1:
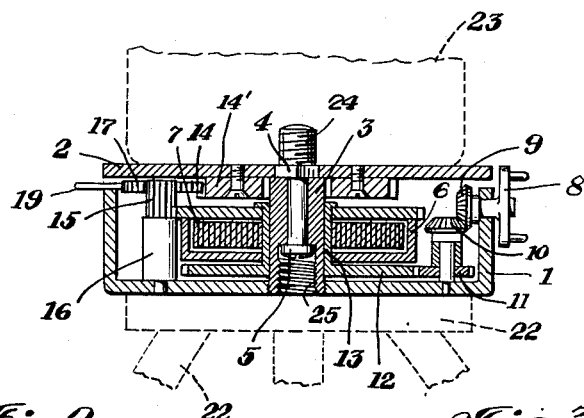
Fig. 1 is a cross-section of a camera rotating unit for rotating the camera about a vertical axis only.

The embodiment shown in Figs. 1 to 4, comprises a stationary base 1 and a plate-shaped camera support 2. Base 1 and support 2 are connected with each other by means of a vertically arranged cylindrical hollow column 3, forming part of base 1 or fixed thereto. Bolt 4 passes through column 3 and is secured by means of screw 5 rotatably to this column. At its upper end bolt 4 is provided with a quadrangular plate engaging a corresponding opening in the camera support 2; furthermore, it is provided at its upper end with a screw bolt 24 enabling the camera 23 to be screwed to the camera support 2. Base 1 is provided on its bottom face with a screw hole or a threaded cylindrical opening 25, enabling this base to be screwed to the top of a tripod 22 of the usual type.

Base 1 contains a spring housing 6 in which spring 7 is arranged; this spring may be wound up by means of winding disk 8; the disk 8 and the conical gear 9 are mounted on one shaft; gear 9 is in mesh with gear 10 mounted on one shaft with gear 11; the latter is in mesh with gear 12 which is secured to the tubular sleeve 13; one end of spring 7 is secured to this sleeve 13, while the other spring end is secured to the spring housing 6. Thus, the spring is wound up by the winding disk 8, by means of the intermediate gears 9, 10, 11, 12, and tube 13. Spring housing 6 is provided on its top with a toothed gear 14 meshing pinion 15 which is rotatably pivoted to base 1 by means of column 16. Pinion 15 is in mesh with gear 17; the latter is rotatably pivoted to lever arm 20. This lever arm 20 is turnably pivoted to base 1 by means of pivot 21 and a column, not visible in the drawings. Gear 17 is constantly in mesh with gear 18, which is also rotatably pivoted to lever arm 20.

Figure 2:
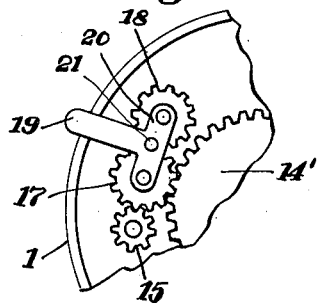
Figs. 2–4 are fragmentary views of the device for reversing the direction of rotation of the camera support, which forms part of the camera rotating unit shown in Fig. 1.
Figure 3:
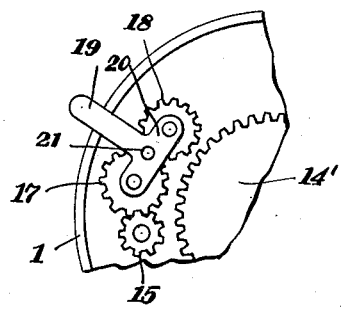
Figure 4:
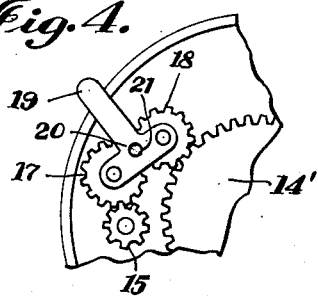
Figure 10:
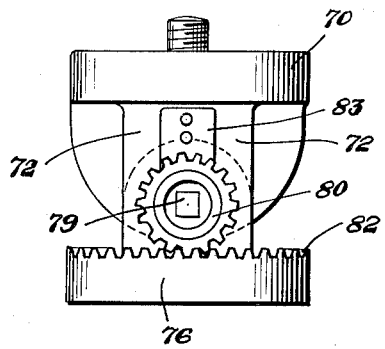
Fig. 10 is a side view of another embodiment of a rotating unit with one spring motor only.

As shown in Figs. 2 to 4, gears 17 and 18 may be turned by means of lever arm 19 into three different positions: in the position shown in Fig. 2, gear 17, being in constant mesh with gear 15, also meshes gear 14', which is secured to camera support 2. Thus, spring 7 rotates the camera support 2 by aid of the gear train consisting of gears 14, 15, 17 and 14'. In the position shown in Fig. 3, both the gears 17 and 18 are turned by aid of lever 19 out of mesh with gear 14', thus being in inoperative position. When gears 17 and 18 are turned by aid of lever 19 into the position shown in Fig. 4, spring 7 rotates the camera support by means of the gears 14, 15, 17, 18, and 14'. Thus, it is evident that the direction of rotation of camera support 2, when driven in the way shown in Fig. 4, is reversed to the direction of rotation attained by driving the support in the way shown in Fig. 2.

In the embodiment shown in Figs. 5 and 6, base 26 is provided with a central column 27 secured thereto. Camera support 29 is rotatably attached to column 27 by means of bolt 28 in the same way as camera support 2, shown in Fig. 1. A toothed crown 30 is fixed to camera support 29; the spring motor driving the camera support 29 is arranged within base 26. It consists of two wall plates 31 and 32, connected by bolts 33. Spring 34 is connected by means of shaft 36 with winding disk 35. The gear 37 is fastened to the opposite end of the spring by means of a ratchet and ratchet wheel, not shown in the drawings. The gear 37 meshes pinion 38 which is carried by a sleeve 38'. This sleeve is carried by shaft 39, journalled slidable in longitudinal direction in bearings 41 and 42. Key pin 40 secured to sleeve 38' engages key way 43 provided in shaft 39. Thus, motion impulses from spring 34 are transmitted upon shaft 39, irrespective of the position of the latter. Two gears 44 and 45' are arranged at both ends of shaft 39; shaft 39 is shorter than the diameter of the toothed crown 30, thereby enabling this shaft to be shifted and to engage this crown either with gear 44 or with gear 45'. The lever 46, pivoted by means of pivot 47 to base 1, is provided for shifting shaft 39.

It will easily be understood by everybody skilled in this art that by sliding shaft 39 it is possible to engage either gear 44 or gear 45' with the toothed crown 30 and thereby to rotate the support 29 in clockwise as well as in counter-clockwise direction.

The rotating unit shown in Figs. 7 to 9 is adapted for rotating the camera support about a vertical axis and to turn it simultaneously about a horizontal axis. For this purpose, base 50 which is adapted to be screwed to a tripod by aid of the cylindrical screw hole 51 is provided with a toothed crown 52. It furthermore rotatably carries the intermediate member consisting of column 53 and shaft 54 fastened to the latter; shaft 54 carries at one end the spring motor unit 60 adapted to be wound up by winding disk 61. Gear 62, driven by and rotatably secured to spring motor unit 60 is constantly in mesh with the toothed crown 52. It is evident that when gear 62 is rotated by spring motor unit 60, the column 53, shaft 54 and spring motor unit 60 are forced to rotate about the vertical axis of column 53.

Besides spring motor unit 60, shaft 54 turnably carries also the camera support 57 which is attached to it by means of the lug-shaped extensions 55 and 56. The screw bolt 58 secured to camera support 57 serves for screwing a camera to the support by means of screw 59.

A spring motor unit 63 is provided in order to turn the camera support 57 about the horizontal shaft 54. This spring motor 63 is secured to support 57. Gear 64, secured to and driven by spring motor 63, is in mesh with gear 65, fastened to shaft 54. As shaft 54 and gear 65 secured thereto do not rotate, the rotation of gear 64 by spring motor 63 forces gear 64 to move along gear 65 and to turn thereby spring motor 63 and camera support 57, secured to this spring motor, about shaft 54.

The rotating unit shown in Figs. 10 to 14 enables either rotating of the camera support about a vertical axis, or turning of the same about a horizontal axis; by aid of this rotating unit these two movements can be carried out only one after the other, and not simultaneously. Contrary to the embodiment shown in Figs. 7 to 9, however, the direction of rotation and turning can be reversed.

This unit comprises a base 76 on which the column 75, serving as intermediate member, is rotatably mounted; this column 75 carries the camera support 70 by means of the hollow sleeve 73 and the lug-shaped extensions 71 and 72. A frictional coupling member 74 is arranged between sleeve 73 and the inner surface of the cylindrical hole in column 75, holding the camera support 70 in any desired tilted position.

Shaft 78 is arranged slidably in longitudinal direction inside of the hollow sleeve 73; one end of shaft 78 is provided with a square-shaft portion 79. A gear 80, provided with knob 81 is arranged freely slidable on this square-shaft.

Figure 11:
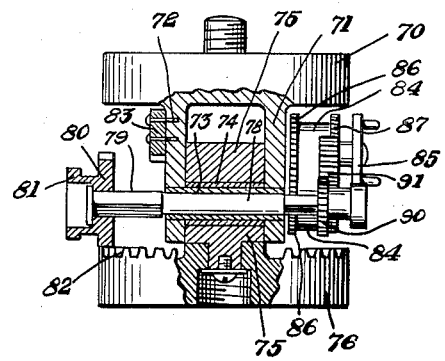
Fig. 11 is a cross-section of the rotating unit shown in Figure 10.
Figure 12:
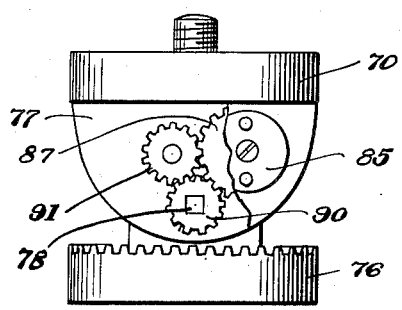
Fig. 12 is a side view of the rotating unit shown in Figure 11, partly in section.

In the position shown in Fig. 11, gear 80 engages the toothed crown 82 on base 76 and thus forces column 75 to rotate about its vertical axis, when gear 80 is rotated by aid of shaft 78.

Figure 13:
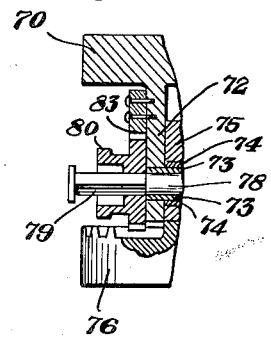
Fig. 13 is a fragmentary cross-section of a detail of the rotating unit shown in Fig. 11.

In the position shown in Fig. 13, gear 80 is in mesh with a toothed sector member 83 fastened to camera support 70; in this case, rotation of shaft 78 and gear 80 forces camera support 70 to rotate together with shaft 78 and so to turn about a horizontal axis.

Thus, by rotating shaft 78 and shifting gear 80 between the positions shown in Figs. 11 and 13, it is possible to rotate support 70 either about a vertical or a horizontal axis.

Figure 14:
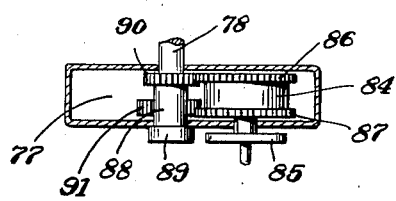
Fig. 14 is a cross-section of the spring motor used for the rotating unit shown in Fig. 11.

If no reversion of the direction of rotation or turning were desired, it would be sufficient to simply rotate shaft 78 by spring motor 77. As, however, in many cases it is advisable to have the possibility to reverse the direction, the spring motor is built as it is shown in Fig. 14, and thus adapted to rotate shaft 78 in clock-wise and counter-clockwise direction. Accordingly, the spring motor consists of spring 84 adapted to be wound up by winding disk 85 and connected with the gears 86 and 87. Shaft 78 is provided at its end cooperating with the spring motor with a square-shaft portion, on which gear 90, connected to sleeve 88 and knob 89, is arranged slidably in longitudinal direction. In the position shown in Fig. 14, gear 90 is in mesh with the gear 86 and thus driven directly by spring 84. In the position shown in Fig. 11, sleeve 88 is pulled outward and thus gear 90 is brought into mesh with the intermediate gear 91 meshing gear 87; by inserting the intermediate gear 91, shaft 78 is not driven directly and thus its direction of rotation is reversed.

Figure 15:
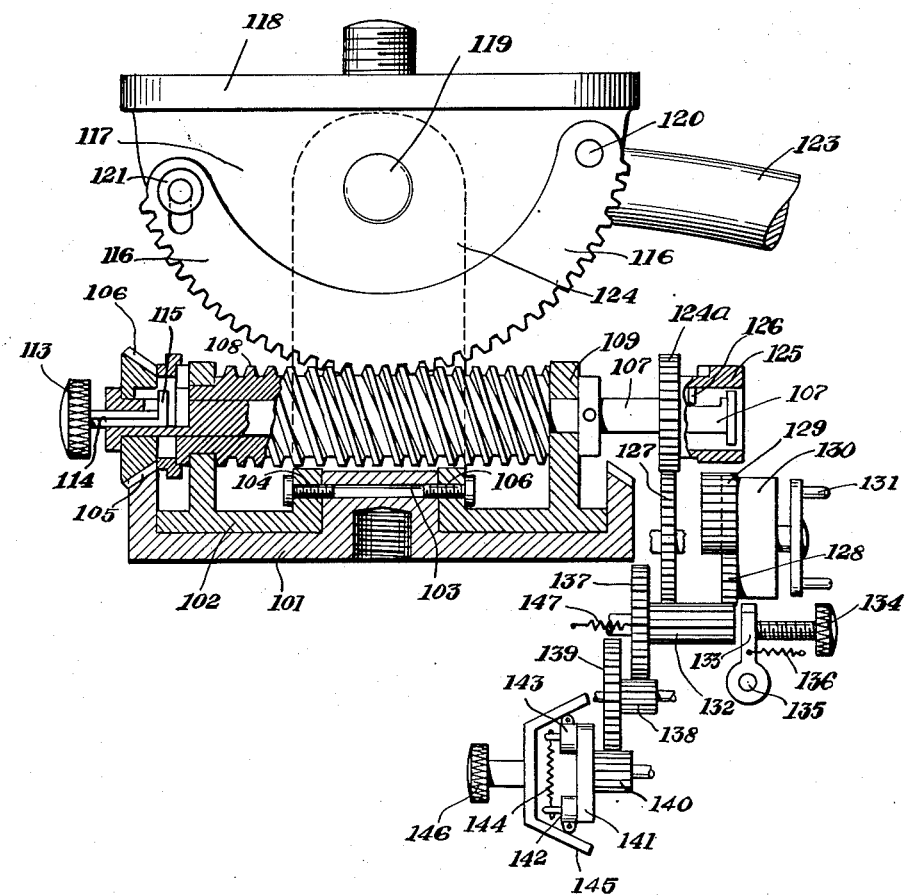
Fig. 15 is a general, partly schematic view of another embodiment of my invention, partly in section.

The rotating unit shown in Fig. 15 is, although equipped with one spring motor only, adapted to rotate and to tilt the camera in the most different ways: the camera support can be rotated around a vertical axis and can be tilted about a horizontal axis; these two movements can be carried out one after the other, or simultaneously; the direction of each of these movements can be reversed; the speed of the movements can be regulated; the spring motor can be disconnected and the camera support rotated and/or tilted by hand.

In order to attain all these purposes, the rotating unit is equipped with a series of cooperating parts: it comprises a base 101 provided with a central, relatively low cylindrical column. An intermediate member, comprising the circular plate 102 and the partly slotted column 124, is arranged on base 101, and rotatably mounted to this base by means of small screws 104 reaching into a horizontal annular slot in the above mentioned cylindrical column.

The camera support 118 is turnably attached to the column 124 by means of pivot 119.

Base 101 is provided along its circular edge with a conical toothed crown 105. This crown engages the conical gear 106, which latter is carried by shaft 107 journalled in lug-shaped extensions 109 on plate 102. The conical gear 106 is arranged freely rotatable on shaft 107. In order to connect and disconnect gear 106 and shaft 107, knob 113 is slidably attached to shaft 107. This is done by providing knob 113 with a square-shaft 114 sliding in a corresponding hole of shaft 107. Pin 115, arranged at the end of shaft 114, is adapted to engage a corresponding slot in gear 106. Thus it is possible to connect gear 106 with shaft 107 by pulling knob 113 outwards and to disconnect this gear and shaft by pushing knob 113 inwards.

Shaft 107, furthermore, carries the worm gear 108. This worm gear is in mesh with a toothed sector member 116; sector member 116 is secured to the vertical plate 117, which latter is forming a part of the camera support 118 and is arranged in the slot provided in column 124. In order to connect and disconnect sector member 116 and the worm gear 108, the sector member is secured to plate 117 turnably about pivot 120 and its position can be adjusted by means of fastening member 121 secured to plate 117 and sliding in a corresponding slot of the sector member 116. By aid of this fastening member it is possible to fix the sector-member 116 in or out of mesh with the worm gear 108.

Although the arrangement described above is a relatively simple one, the camera support 118 can be moved in the most different ways by means of this arrangement:

(1) When the sector member 116 is in raised, disengaged position, and knob 113 is in pulled-out position connecting shaft 107 with gear 106, and shaft 107 is rotated, then the intermediate member and camera support 118 are rotated about the vertical axis of column 124.

(2) When knob 113 is pushed in and gear 106 is disengaged thereby, and the sector member 116 in in lowered position as shown in Fig. 15, and shaft 107 is rotated, then the camera support 118 rotates about the horizontal pivot 119.

(3) When knob 113 is pulled out, and the sector member 116 is in the position shown in Fig. 15, and shaft 107 is rotated, then the camera support 118 simultaneously rotates about the vertical axis of column 124, and about the horizontal pivot 119, thus carrying out a combined rotating and tilting movement.

It is, however, also possible to tilt and to rotate the camera support 118 by lever 123 secured to the support after disconnecting shaft 107 from the spring motor, or without disconnecting the spring, using it as brake.

The main elements of the spring motor for rotating shaft 107 are a spring 130, a winding disk 131 for winding up spring 130, and a gear 128 driven by spring 130. Gear 128 is in mesh with pinions 129 and 132, the latter being in mesh with gear 127. Gears 127 and 129 serve for driving shaft 107 in opposite directions. In order to enable a driving connection between shaft 107 and each of these gears separately, the tubular member 125 is arranged slidably on shaft 107 and is provided with key pin 126 sliding in a corresponding slot or key way of shaft 107; this tubular member carries gear 124a in such a manner that this gear might be in mesh either with gear 127 or with gear 129, or with none of them. In the latter case, the camera support can be rotated or tilted quickly, by hand, without being braked by the spring motor.

In order to control and regulate the speed of rotation and/or tilting of the camera support, pinion 132 is built together with gear 137; gear 137, pinion 138, gear 139, and pinion 140 form a gear train, connecting pinion 132 with the speed regulating device. This device consists of a disk 141 secured to pinion 140, centrifugal members 142 and 143 slidably arranged in radial slots of plate 141 and connected by spring 144. A conical member 145, movable by means of knob 146, normal to the direction of plate 141, serves for limiting and regulating the distance of the centrifugal members 142 and 143 from the axis of rotation of plate 141. By regulating this distance, it is possible to regulate the braking effect of this speed regulating arrangement as desired.

For controlling and regulating the speed of the camera support when rotated and/or tilted by hand, pinion 132 is arranged slidably on its shaft. Lever 133, pivoted about pivot 135, can be pushed by means of knob 134 into engagement with gear 128; lever 133 is shaped in such a manner as to engage with and thus block rotation of gear 128 when it is moved by knob 134 toward pinion 132, pushing this pinion out of engagement with gear 128. In this position pinion 132 is not in mesh with gear 128, and shaft 107 is disconnected from the spring motor and connected only with the speed regulating means described above. Thus, when in this position the camera support is rotated by hand, the speed regulating means will brake and thereby equalize the movement of the support. Tension spring 136 serves for retracting lever 133 into inoperative position when knob 134 is turned in counter-clockwise direction, and compression spring 147 pushes pinion 132 again into mesh with pinion 128 when lever 133 is retracted, thereby restoring the driving connection between the spring motor and shaft 107.

I want to note that I have shown in Fig. 15 the spring motor, the speed regulating device and the gear train connecting the same, and shaft 107 unsupported by base 101; this I have done in order to show these elements more clearly; it is evident that this schematic view corresponds not to the actual construction of the unit: when actually built, all elements mentioned above are mounted on base 101 or they are fastened to a separate platform, or the like, secured to this base.

It should be stressed that each embodiment described above is provided with means for releasing and stopping the spring motor, or motors; it is so obvious to arrange these means that I considered it as superfluous to show them in the drawings.

It will be understood that each of the elements described above, or two or more together, may also find a useful application in other types of camera rotating units differing from the types described above.

While I have illustrated and described the invention as embodied in tripod heads, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. A camera rotating unit driven by a spring motor and adapted to be inserted between the top of a tripod of the usual type and a camera, said unit comprising a base provided on its bottom face with a cylindrical screw hole of the type used in cameras for screwing the same to the screw bolt usually provided on the top of a tripod, an intermediate member mounted on said base rotatably about a vertical axis, a camera support provided on its top face with a screw bolt of the type used on the top of tripods for screwing a camera thereto, said camera support mounted on said intermediate member turnably about a horizontal axis, a spring motor fastened to said intermediate member, a horizontally arranged gear forming part of said base, a vertically arranged gear forming part of said camera support, a common horizontal shaft turnably mounted on said intermediate member, gear means connecting said spring motor with said common horizontal shaft and driving the same, and separate gear means mounted on said common horizontal shaft and meshing with said horizontally arranged gear on the one hand and said vertically arranged gear on the other hand.

2. A camera rotating unit driven by a spring motor and adapted to be inserted between the top of a tripod of the usual type and a camera, said unit comprising a base provided on its bottom face with a cylindrical screw hole of the type used in cameras for screwing the same to the screw bolt usually provided on the top of a tripod, an intermediate member mounted on said base rotatably about a vertical axis, a camera support provided on its top face with a screw bolt of the type used on the top of tripods for screwing a camera thereto, said camera support mounted on said intermediate member turnably about a horizontal axis, one spring motor fastened to said intermediate member, a horizontally arranged gear forming part of said base, a vertically arranged gear forming part of said camera support, a common horizontal shaft turnably mounted on said intermediate member, gear means connecting said spring motor with said common horizontal shaft and driving the same, rotating gear means mounted on said common horizontal shaft and meshing with said horizontally arranged gear forming part of said base, tilting gear means mounted on said common horizontal shaft and meshing with said vertically arranged gear forming part of said camera support, and means for disengaging said tilting gear means and said vertically arranged gear whenever required so as to avoid automatic tilting of said camera support.

3. A camera rotating unit driven by a spring motor and adapted to be inserted between the top of a tripod of the usual type and a camera, said unit comprising a base provided on its bottom face with a cylindrical screw hole of the type used in cameras for screwing the same to the screw bolt usually provided on the top of a tripod, an intermediate member mounted on said base rotatably about a vertical axis, a camera support provided on its top face with a screw bolt of the type used on the top of tripods for screwing a camera thereto, said camera support mounted on said intermediate member turnably about a horizontal axis, one spring motor mounted on said intermediate member, a horizontally arranged gear forming part of said base, a vertically arranged gear forming part of said camera support, a common horizontal shaft turnably mounted on said intermediate member, gear means connecting said spring motor with said common horizontal shaft and driving the same, rotating gear means mounted on said common horizontal shaft and meshing with said horizontally arranged gear forming part of said base, tilting gear means mounted on said common horizontal shaft and meshing with said vertically arranged gear forming part of said camera support, and means for disengaging said rotating gear means and said common horizontal shaft whenever required so as to avoid automatic turning of said camera support.

4. A camera rotating unit driven by a spring motor and adapted to be inserted between the top of a tripod of the usual type and a camera, said unit comprising a base provided on its bottom face with a cylindrical screw hole of the type used in cameras for screwing the same to the screw bolt usually provided on the top of a tripod, an intermediate member mounted on said base rotatably about a vertical axis, a camera support provided on its top face with a screw bolt of the type used on the top of tripods for screwing a camera thereto, said camera support mounted on said intermediate member turnably about a horizontal axis, one spring motor mounted on said intermediate member, a horizontally arranged gear forming part of said base, a vertically arranged gear forming part of said camera support, a common horizontal shaft turnably mounted on said intermediate member, gear means connecting said spring motor with said common horizontal shaft and driving the same, rotating gear means mounted on said common horizontal shaft and meshing with said horizontally arranged gear forming part of said base, tilting gear means mounted on said common horizontal shaft and meshing with said vertically arranged gear forming part of the camera support, means for disengaging said rotating gear means and said common horizontal shaft whenever required so as to avoid automatic turning of said camera support, and means for disengaging said tilting gear means and said vertically arranged gear whenever required so as to avoid automatic tilting of said camera support.

5. A camera rotating unit driven by a spring motor, said unit comprising a base provided on its bottom face with a cylindrical screw hole, an intermediate member mounted on said base rotatably about a vertical axis, a camera support provided on its top face with a screw bolt, said camera support mounted on said intermediate member turnably about a horizontal axis, one spring motor mounted on said intermediate member, a horizontally arranged gear forming part of said base, a vertically arranged gear forming part of said camera support, a common horizontal shaft turnably mounted on said intermediate member, gear means connecting said spring motor with said common horizontal shaft, rotating gear means mounted on said common horizontal shaft and meshing with said horizontally arranged gear, tilting gear means mounted on said common horizontal shaft and meshing with said vertically arranged gear, means for disengaging said rotating gear means and said common horizontal shaft whenever required, means for disengaging said tilting gear means and said vertically arranged gear whenever required, means for manually winding up said spring motor, means for starting and stopping operation of said spring motor, and means for reversing the direction of turning of said common horizontal shaft whenever required.

JACQUES BOLSEY.